(12) United States Patent
Rattner et al.

(10) Patent No.: US 12,400,033 B2
(45) Date of Patent: Aug. 26, 2025

(54) ANONYMIZING PERSONALLY IDENTIFYING INFORMATION IN IMAGE DATA

(71) Applicant: YEMBO, INC., San Diego, CA (US)

(72) Inventors: Zachary Rattner, San Diego, CA (US);
Devin Waltman, San Diego, CA (US);
Noel Kennebeck, San Diego, CA (US);
Maciej Halber, San Diego, CA (US)

(73) Assignee: YEMBO, INC., San Diego, CA (US)

( * ) Notice: Subject to any disclaimer, the term of this patent is extended or adjusted under 35 U.S.C. 154(b) by 325 days.

(21) Appl. No.: 18/165,866

(22) Filed: Feb. 7, 2023

(65) Prior Publication Data

US 2024/0265141 A1    Aug. 8, 2024

(51) Int. Cl.
*G06F 21/00* (2013.01)
*G06F 21/62* (2013.01)
*G06V 10/82* (2022.01)
*G06V 30/19* (2022.01)
*G06V 40/16* (2022.01)

(52) U.S. Cl.
CPC .......... *G06F 21/6254* (2013.01); *G06V 10/82* (2022.01); *G06V 30/191* (2022.01); *G06V 40/16* (2022.01)

(58) Field of Classification Search
CPC . G06F 21/6254; G06F 21/6245; G06V 10/82; G06V 30/191; G06V 40/16
See application file for complete search history.

(56) References Cited

U.S. PATENT DOCUMENTS

| 10,528,962 | B2 | 1/2020 | Rattner et al. | |
| 10,867,328 | B2 | 12/2020 | Rattner et al. | |
| 11,270,363 | B2 | 3/2022 | Rattner et al. | |
| 11,546,141 | B1* | 1/2023 | Guest | H04L 9/0825 |
| 2019/0377901 | A1* | 12/2019 | Balzer | H04L 63/0421 |
| 2021/0279957 | A1 | 9/2021 | Eder et al. | |
| 2022/0335159 | A1* | 10/2022 | Hahn | G06F 21/6281 |

(Continued)

OTHER PUBLICATIONS

Morales et al., "SensitiveNets: Learning Agnostic Representations with Application to Face Images", IEEE Transactions on Pattern Analysis and Machine Intelligence, vol. 43, Issue: 6, Jun. 1, 2021.*

(Continued)

*Primary Examiner* — Morshed Mehedi
(74) *Attorney, Agent, or Firm* — Pillsbury Winthrop Shaw Pittman LLP

(57) ABSTRACT

Receiving image data of a location in the form of a video feed, pictures, and/or depth information, as examples, from a client device controlled by a user, and/or other data is described. The received data serves as an input to a model (e.g., an artificial intelligence (AI)-based model such as a machine learning model) configured to generate an electronic representation of the location enriched with spatially localized details about surfaces and contents of the location. The electronic representation can be used for various purposes. The present disclosure provides a systems, methods, and computer programs that resolve several impediments in existing three dimensional image data acquisition and/or visualization systems by anonymizing personally identifying information (PII) in the received image data.

27 Claims, 5 Drawing Sheets

(56) References Cited

U.S. PATENT DOCUMENTS

2023/0195937 A1* 6/2023 Stalling ................. G16H 10/60
                                                                  705/2
2023/0229790 A1* 7/2023 Mozer ..................... G06F 21/53
                                                                  726/26

OTHER PUBLICATIONS

Newton et al., "Preserving Privacy by De-Identifying Face Images", IEEE Transactions on Knowledge and Data Engineering, vol. 17, No. 2, Feb. 2005.*
Morales et al., "SensitiveNets: Learning Agnostic Representations with Application to Face Images", IEEE Transactions on Pattern Analysis and Machine Intelligence, vol. 43, Issue: 6, 01 June (Year: 2021).*

\* cited by examiner

ANONYMIZING PERSONALLY IDENTIFYING INFORMATION IN IMAGE DATA

FIELD OF THE DISCLOSURE

This disclosure relates to anonymizing personally identifying information in image data.

BACKGROUND

Various tasks for home services revolve around an accurate two and/or three-dimensional spatial and semantic understanding of a location such as a home. For example, planning renovations requires understanding the current state and dimensions of the home. Filing an insurance claim requires accurate documentation and measurements of structures and/or corresponding damages. Moving into a new home requires a reliable inventory of items in the original dwelling unit, for example. Electronic methods for acquiring two and/or three-dimensional spatial and semantic data for a location exist, but these methods do not anonymize personally identifying information in the acquired data.

SUMMARY

Receiving image data of a location in the form of a video feed, pictures, and/or depth information, as examples, from a client device controlled by a user, and/or other data is described. The received data serves as an input to a model (e.g., an artificial intelligence (AI)-based model such as a machine learning model) configured to generate an electronic representation of the location enriched with spatially localized details about surfaces and contents of the location. The electronic representation can be used for various purposes. The present disclosure provides a system that resolves several impediments in existing three dimensional image data acquisition and/or visualization systems by anonymizing personally identifying information (PII) in the received imaged data.

Failure to solve problems related to anonymizing PII in received image data can reduce or prevent adoption of virtual inspection tools. For example, a video stored in the cloud that includes PII may be a bigger privacy risk than an onsite inspector seeing photos/videos when they visit a building due to the data being collected into an online database. To overcome this and other challenges, a non-transitory computer readable medium having instructions thereon for anonymizing PII is provided. The instructions are configured to cause a computer to execute several operations. Executing may include following a set of machine readable instructions stored in a computer readable storage medium. The instructions cause operations comprising receiving image data from an imaging device; determining that a suspect portion of the image data can or does contain PII; generating anonymized image data by digitally altering the suspect portion of the image data to substantially remove the PII; and modifying the image data by replacing the suspect portion of the image data with the anonymized image data; and/or other operations.

In some embodiments, PII comprises information which is related to an identified or identifiable natural person. For example, the PII may comprise one or more of an image (e.g., including a reflection) of a face, a person, an animal, a document listing a name, a document listing an address, an identification card, a calendar, a prescription bottle, a title of a book, a document that includes other PII, an image of a landmark, a license plate, and/or other PII.

In some embodiments, a suspect portion of the image data that can contain PII comprises types of objects identified in the image data that are known to sometimes include PII, but not always. The types of objects comprise mirrors, picture frames, photographs, television or computer monitors, windows, text containing objects, and/or other objects.

In some embodiments, the imaging device comprises a depth sensor and/or a camera, and the image data comprises depth information from the depth sensor and/or pictures or video from the camera.

In some embodiments, digitally altering the suspect portion of the image data comprises one or more of gaussian blurring, redacting or removing, or replacement of the suspect image data with a generic image from a library or a generic 3D model. For example, digitally altering the suspect portion of the image data may comprise blurring the suspect image data. A degree of digitally altering the suspect portion of the image data may vary from a blurring or pixelation to a full redaction or removal of the suspect portion of the image data. In some embodiments, substantially removing the PII comprises applying one or more digital alterations to the image data that reduce or eliminate an ability of a person or computer software to obtain the PII from the anonymized image data. In some embodiments, digitally altering the suspect image data is configured to make it impossible for most humans to obtain the PII by visual inspection of images generated from the anonymized image data. In some embodiments, digitally altering the suspect image data is configured to make it impossible, or require a significant increase in processing power and/or time, for a computer to extract usable PII from the anonymized image data.

Since present use cases (e.g., moving, insurance, etc.) require faithful depiction of the location that was scanned, the present systems and methods are configured to minimize the destructive quality of the anonymization (e.g., blurring and/or other anonymization). For example, blurring too much or anonymizing too much image data can degrade a user's ability to use the result for a specific use case (e.g., if image data is blurred too much, a mover might not be able to accurately identify the items he or she is moving).

In some embodiments, the operations further comprise determining that the suspect portion of the image data does contain PII. The determining comprises performing facial recognition on the image data to detect a face, and the generating of anonymized image data digitally alters the face. In some embodiments, the determining comprises performing optical character recognition on the image data to detect characters, and the generating of anonymized image data digitally alters the characters.

In some embodiments, the operations further comprise identifying an object from the image data; determining that the object is a suspect object that can include the PII; and generating the anonymized image data for at least a portion of the suspect object. In some embodiments, the operations further comprise: identifying a plurality of objects from the image data; and generating anonymized image data for only the suspect object and not generating anonymized image data for any of the plurality of objects not identified as suspect objects. Generating anonymized image data only for the suspect object comprises anonymizing the PII and potential incidental anonymization of nearby image data including pixels near a boundary of a photo, face, or document; and/or pixels in spaces between and inside text.

In some embodiments, the anonymized image data comprises only the PII and does not include other portions of the image data that do not contain the PII.

In some embodiments, the operations further comprise: storing the suspect portion of the image data in temporary computer memory; performing the generation of the anonymized image data from the suspect portion without storing the suspect portion in permanent computer memory; and transferring the anonymized image data to permanent computer memory.

In some embodiments, the generating of the anonymized image data is performed at the imaging device. In some embodiments, the determining is performed in a first part at the imaging device and in a second part at a server. The first part may include performing facial recognition, and the second part may include performing object identification, for example.

In some embodiments, the suspect portion is anonymized within a two dimensional (2D) bounding box, a three dimensional (3D) bounding box, a 2D polygon, a 3D polygon, or a semantic segmentation mask. In some embodiments, the image data is 3D. 3D image data may include, for example, a 3D model such as a glTF file, a 2D video+depth data that can be used to generate a 3D model, and/or other 3D image data. For example, a smartphone may capture 2D video (e.g., an H.265 video) and a 2D depth map (e.g., a lossless .png sequence), and inertial measurement unit (IMU) data (e.g., data collected from an accelerometer, a gyroscope, a magnetometer, and/or other sensors, represented in .json format, for example)—which is all 2D data but is sufficient to generate a 3D model. Determining that a suspect portion of the image data can or does contain personally identifying information (PII) may comprise performing object detection and mask prediction on the image data using a neural network. In some embodiments, the neural network is a mask region based convolutional neural network (R-CNN).

In some embodiments, generating anonymized image data by digitally altering the suspect portion of the image data to substantially remove the PII, and modifying the image data by replacing the suspect portion of the image data with the anonymized image data comprises: extracting binary masks from neural network outputs and saving the binary masks to a video file; saving a metadata file that stores indices of frames of the image data in which PII was detected; combining the binary masks with the image data based on the indices; and applying a blur to frames of the image data that contain PII based on the masks.

In some embodiments, the operations further comprise generating a 2D image or 3D model based at least on the anonymized image data. In some embodiments, the operations further comprise generating, with a machine learning model, an inventory list based at least on the anonymized image data.

According to other embodiments, systems and/or methods configured to perform the operations described above are also provided.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
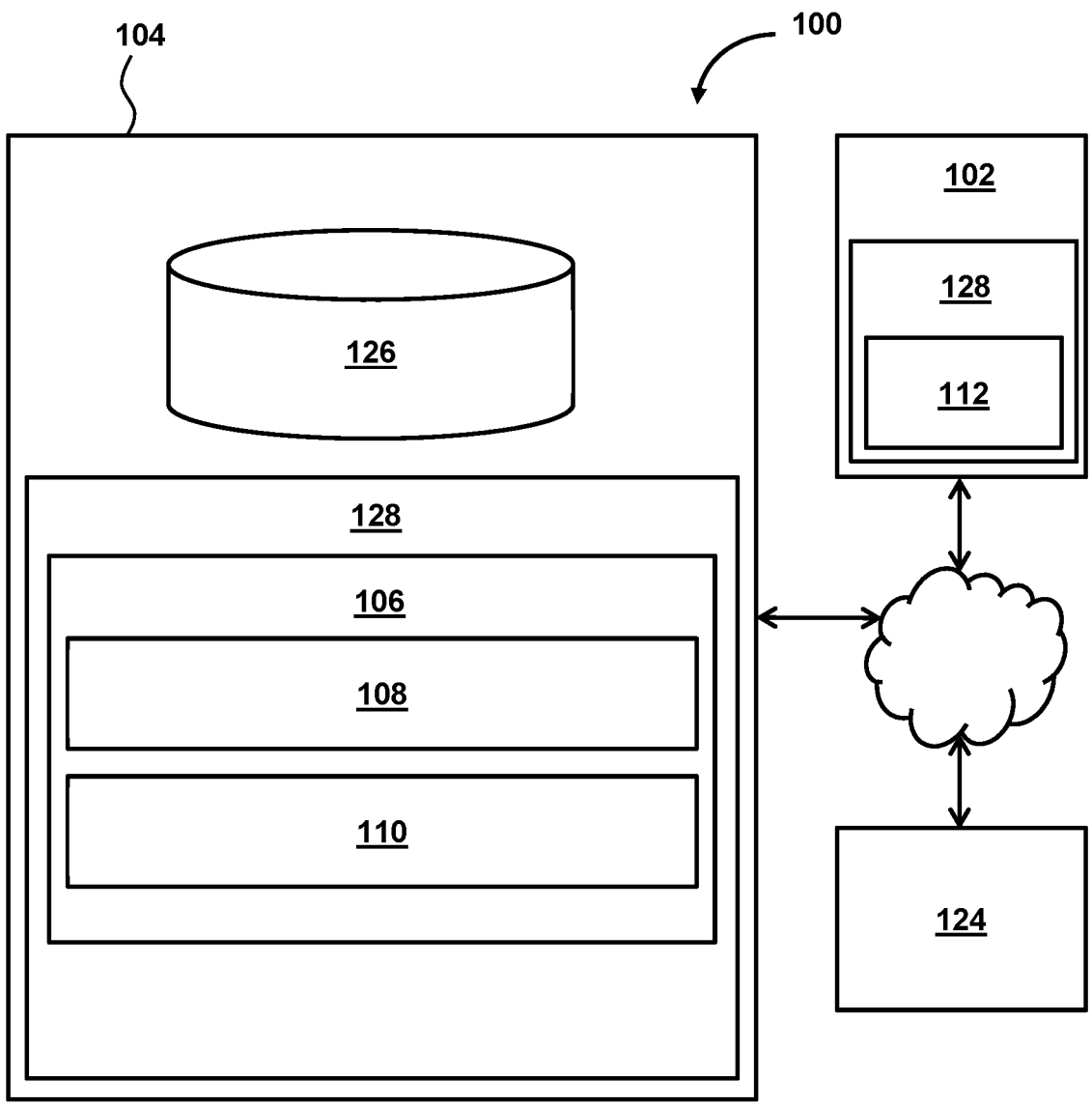
FIG. 1 illustrates a system for anonymizing personally identifying information (PII) in image data, in accordance with one or more embodiments.

As described above, the present disclosure provides a system that resolves several impediments in existing three dimensional image data acquisition and/or visualization systems by anonymizing personally identifying information (PII) in captured or otherwise received image data. The techniques descried herein build on the techniques described in U.S. Pat. Nos. 11,270,363, 10,867,328, and 10,528,962, and in U.S. patent application Ser. No. 17/194,075, each of which is incorporated by reference in its entirety. The techniques describe herein focus on a sensitive aspect of the image data acquisition process described in these patents and applications—how to avoid capturing unnecessary PII. This approach is applicable anywhere a user is capturing media off of a user device for analysis—e.g., media including photos, videos for (e.g., moving or insurance) inventory list generation, videos for three dimensional (3D) model generation, and other media.

Virtual inspection tools typically facilitate fully scanning a location (e.g., a room) and building a virtual representation (e.g., a two dimensional (2D) or three dimension (3D) electronic representation of the location) that can be used to generate measurements, identify contents, and other workflows that are useful in property insurance, moving, and/or other scenarios. Prompting a user to fully scan a location is performed to ensure capture of relevant elements of the structure and contents of the location for analysis. However, unnecessary PII (e.g., faces in mirrors; photos on the wall of a faces, people, animals, landmarks, license plates, etc.; names, addresses and/or other information on printed documents; an identification card; a calendar; a prescription bottle; a title of a book; sensitive documents; etc.) may be captured during a scan.

Failure to anonymize PII in image data can reduce or prevent adoption of virtual inspection tools, cause virtual inspection tools to be non-compliant with privacy laws (in the United States and around the world), and/or has other risks. For example, a user may be reluctant to generate, communicate, and/or store a video of their house, bedroom, etc., in the cloud for fear that PII in captured image data may not be secure and/or may be obtained by bad actors. To a user, this may be a bigger privacy risk than an onsite inspector seeing photos/videos when they visit a location, for example. For a virtual inspection service provider, failure to anonymize PII in collected image data could have legal, financial, and/or other consequences. As alternatives, virtual inspection tools may attempt to provide instructions asking a user not record unnecessary PII, but this is cumbersome to the user. Also, legal and/or procedural safeguards exist to ban those who may handle PII from acting unethically with the PII, but a single bad actor renders these safeguards vulnerable to a breach.

The present systems and methods improve on prior techniques by providing more privacy than a traditional onsite inspector and/or prior virtual inspection tools. With the present systems and methods, a user is prompted to capture a video, images, and/or other image data of a location, which potentially includes PII. An anonymizer detects regions of the image data that contain PII or could potentially contain PII and anonymizes (e.g., blurs or performs other anonymization) these regions as appropriate. The anonymizing intentionally degrades the image quality of the image data, and may be performed before further analysis runs on the image data (as described herein and in the references incorporated above). Therefore, the present systems and methods are configured to limit anonymized regions of the image data only to those strictly necessary. In addition, the anonymizer is configured to run on the user's device that captures the image data, so the PII never leaves the user's device. Once anonymized, the image data may be processed through remaining virtual inspection operations (e.g., location virtual representation generation, content identification, measurement determination, inventory list generation, insurance quote generation, etc.).

The present systems and methods may be used for things like planning renovations to a location such as a home, which may require understanding the dimensions and/or current state of the location; obtaining insurance, which may require an inspection and accurate documentation of the location and its contents; and moving into a new location, which requires a reliable estimate as to whether one's belongings and furniture will fit, as examples. The present systems and methods reduce or eliminate the time required for an onsite inspection (e.g., by an insurance adjuster) including scheduling an appointment that is convenient for all parties; minimizes error and bias (e.g., because the computer based system described herein behaves the same every time, unlike people); provides accurate, auditable (e.g., recorded video data can be saved), non-human dependent measurements; and/or has other advantages.

FIG. 1 illustrates a system 100 for anonymizing personally identifying information (PII) in image data, in accordance with one or more embodiments. PII comprises information which is related to an identified or identifiable natural person. For example, PII may include faces in mirrors; photos on the wall of a faces, people, animals, landmarks, license plates, etc.; names, addresses and/or other information on printed documents; an identification card; a calendar; a prescription bottle; a title of a book; sensitive documents; and/or other PII. System 100 is configured to receive image data of a physical scene from an imaging device. A physical scene may be indoors or outdoors at a location. The location may be any open or closed spaces for which an electronic representation (e.g., a 2D or 3D model) may be generated. For example, the physical scene at the location may be a room, a warehouse, a classroom, an office space, an office room, a restaurant room, a coffee shop, a room or rooms of a house or other structure, a porch or yard of the structure, etc.

In some embodiments, system 100 may include one or more servers 102. The server(s) 102 may be configured to communicate with one or more user computing platforms 104 according to a client/server architecture. The users may access system 100 via user computing platform(s) 104. System 100 utilizes information from cameras, depth sensors, microphones, location sensors, inertial measurement unit (IMU) data (e.g., data collected from an accelerometer, a gyroscope, a magnetometer, and/or other sensors), text data, questions asked by a human agent or a machine learning algorithm based on sent images, videos, previous answers as well as answers by the consumer on a mobile device (e.g., smartphone, tablet, and/or other mobile device that forms a user computing platform 104), and/or other information to obtain the image data and/or generate an electronic representation for a location. Execution of the various operations described herein by system 100 may include following a set of machine readable instructions stored in a computer readable storage medium for receiving image data, and anonymizing the image data; generating, determining, running, displaying, etc., an electronic representation of a location; and/or other operations, for example.

System 100 may include server(s) 102, computing platform(s) 104, external resources 124, and/or other components. In some embodiments, server(s) 102, computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes embodiments in which server(s) 102, computing platform(s) 104, and/or external resources 124 may be operatively linked via some other communication media.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client a user computing platform 104 and vice versa.

External resources 124 may include sources of information, hosts and/or providers of social network platforms outside of system 100, external entities participating with system 100, and/or other resources. In some embodiments, some or all of the functionality attributed herein to external resources 124 may be provided by resources included in system 100.

User computing platform(s) 104 may be configured to obtain image data of a location. Once anonymized, the image data may be communicated to server 102. (Though in some embodiments, system 100 may be configured such that the anonymization is performed on server 102.) Image data may include one or more of digital photos, images, videos, audio, local digital media items, connected digital media items, and/or other description data. Local digital media items may include digital media items stored locally at a given user computing platform 104. Connected digital media items may include digital media items stored remotely from a given user computing platform 104 such as at other user computing platforms 104, at other locations within system 100, and/or locations outside of system 100. Connected digital media items may be stored in the cloud.

A given computing platform 104 may include electronic storage 126, one or more processors 128 configured to execute machine-readable instructions 106, and/or other components. The machine-readable instructions 106 may be configured to enable an expert or user associated with the given computing platform 104 to interface with system 100 and/or external resources 124, and/or provide other functionality attributed herein to computing platform(s) 104. By way of non-limiting example, the given computing platform 104 may include one or more of a desktop computer, a laptop computer, a handheld computer, a tablet computing platform, a Netbook, a Smartphone, a gaming console, and/or other computing platforms.

Electronic storage 126 may comprise non-transitory storage media that electronically stores information. The electronic storage media of electronic storage 126 may include one or both of system storage that is provided integrally (i.e., substantially non-removable) with a computing platform 104 and/or removable storage that is removably connectable to computing platform(s) 104 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information obtained and/or received by a computing platform 104 (e.g., image data) information determined by processor(s) 128 (e.g., anonymized image data), information received from server(s) 102, information received from other computing platform(s) 104, and/or other information that enables system 100 to function as described herein. Similar electronic storage may be provided in server(s) 102, in external resources 124, and/or in other components of system 100.

Processor(s) 128 may be configured to provide information processing capabilities in computing platform(s) 104, server(s) 102, and system 100. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as multiple entities (e.g., with one or more processors 128 in a computing platform 104, and one or more processors 128 in a server 102), this is for illustrative purposes only. In some embodiments, processor(s) 128 may include a single processing unit. Processing units that form processor 128 may be physically located within the same device (e.g., in a single computing platform 104), or processor(s) 128 may represent processing functionality of a plurality of devices operating in coordination (e.g., one or more processors in a computing platform 104 and one or more processors in a server 102). The processor(s) 128 may be configured to execute machine-readable instruction 106 components 108, 110, 112, and/or other machine-readable instruction components. Processor(s) 128 may be configured to execute machine-readable instruction components 108, 110, 112, and/or other machine-readable instruction components by software; hardware; firmware; some combination of software, hardware, and/or firmware; and/or other mechanisms for configuring processing capabilities on processor(s) 128. As used herein, the term "machine-readable instructions" may refer to any code and/or other programming, and/or instructions that cause a computing device and/or server to perform the functionality attributed to the components of processors 128.

It should be appreciated that although components 108, 110, and 112 are illustrated in FIG. 1 as being implemented within multiple processing units, embodiments are contemplated in which processor(s) 128 include a single processing unit. For example, components 108, 110, and 112 may be co-located in a single processor 128 in a computing platform 104 or in a server 102. The description of the functionality provided by the different components 108, 110, and/or 112 described herein is for illustrative purposes, and is not intended to be limiting, as any of machine-readable instruction components 108, 110, and/or 112 may provide more or less functionality than is described. For example, one or more of machine-readable instruction components 108, 110, and/or 112 may be eliminated, and some or all of its functionality may be provided by other ones of machine-readable instruction components 108, 110, and/or 112. As another example, processor(s) 128 may be configured to execute one or more additional machine-readable instruction components that may perform some or all of the functionality attributed herein to one of machine-readable instruction components 108, 110, and/or 112.

The server(s) 102 and/or computing platform(s) 104 may be configured to execute machine-readable instructions 106. The machine-readable instructions 106 may include one or more of a receiving component 108, an anonymizing component 110, a generating component 112, and/or other components. One or more of components 108, 110, and/or 112, may include sub-components related to other applications of the present systems and methods. In some embodiments, some or all of the components may be located in server(s) 102, in computing platform(s) 104, a combination of the two, and/or other computing devices. The anonymization (e.g., the operations performed by one or more processors 128) may be performed in a computing platform, on a server, in the cloud, and/or by other devices.

One or more of components 108-112 may cooperate with (e.g., send information to, receive information from, and/or other cooperation) and/or form some or all of one or more electronic models. Machine readable instructions 106 may be configured to cause server 102 (and/or a computing platform 104) to generate and/or execute one or more electronic models. The one or more electronic models may comprise machine learning and/or other artificial intelligence models. The one or more electronic models may comprise various networks, algorithms, equations, lookup tables, heuristics or conditions, 3D geometric models, and/or other models. In some embodiments, the one or more electronic models may include classification algorithms, neural networks, and/or combinations thereof.

The one or more electronic models may include a machine learning model that includes a deep neural net such as a convolutional neural network (CNN), recurrent neural network (RNN), long short term memory (LSTM) network, etc. For example, determining that a suspect portion of image data can or does contain personally identifying information (PII) comprises performing object detection and mask prediction or bounding box detection on the image data using a neural network. In some embodiments, the neural network is a mask region based convolutional neural network (R-CNN). However, the one or more electronic models are not limited to only these types of networks. The model(s) may be configured to read images either sequentially or as a batch. Multiple different algorithms may be used to process one or more different inputs. In some embodiments, the one or more electronic models may include a multi-stage electronic model for generating an interactive 3D representation comprising data items corresponding to surfaces and/or contents in a physical scene at a location, identifying objects in the physical scene, and/or for other purposes. The multi-stage model may comprise, for example, a trained neural network having a first stage that identifies suspect portions of the image data that may include PII, and a second stage configured to generate and electronic representation of the physical scene once the image data has been appropriately anonymized.

In some embodiments, an electronic model may use one or more geometric 3D reconstruction frameworks such as Structure-from-Motion (SfM), Simultaneous Localization and Mapping (SLAM), and Multi-View Stereo (MVS) to create one or more electronic representations of a physical scene at a location that can be used in conjunction with image data anonymization and object identifications in order to generate an electronic representation of the location. Using information about the intrinsics of the camera (e.g. focal length and principal point), for example, and or other sensors included in a computing platform 104, and its relative orientation in an electronic representation (e.g. rotation and position) provided by a user or estimated via a geometric reconstruction framework, identified objects, surfaces, and/or other contents may be spatially localized in 3D to determine their relative position in the physical scene. In some embodiments, an electronic representation may be estimated by a machine learning model that is trained to predict an interactive 3D electronic representation from a collection of images or video frames with associated camera information (e.g. intrinsics and extrinsics). In some embodiments, an electronic representation may be computed using data from a depth scanning device. In some embodiments, an electronic representation may be input to a machine learning model to identify and localize objects, surfaces, and/or other contents in a physical scene at a location. In some embodiments, a user may inspect the electronic representation and/or adjust the electronic representation using system 100.

Receiving component 108 may be configured to receive image data of a physical scene (e.g., a room) at a location (e.g., a user's house). The image data may be captured by a user computing platform 104 (e.g., a user's smartphone) and/or other devices, for example. The image data may be 2D and/or 3D. In some embodiments, image data comprises one or more images of the physical scene, and the one or more images are generated via a camera, a depth sensor, and/or other devices associated with a user (e.g., the user's smartphone). In some embodiments, 2D image data comprises pictures, video, etc. In some embodiments, 3D image data includes a 3D model and/or other 3D representations of a location. In some embodiments, 3D image data may include, for example, a 3D model such as a glTF file, a 2D video and depth data that can be used to generate a 3D model, and/or other 3D image data. For example, a smartphone may capture 2D video (e.g., an H.265 video) and a 2D depth map (e.g., a lossless .png sequence), and inertial measurement unit (IMU) data (e.g., data collected from an accelerometer, a gyroscope, a magnetometer, and/or other sensors, represented in .json format, for example)—which is all 2D data but is sufficient to generate a 3D model.

In some embodiments, the image data comprises one or more media types. The one or more media types comprise at least one or more of video data, image data, audio data, text data, user interface/display data, and/or sensor data. In some embodiments, the image data is time stamped, geo stamped, user stamped, and/or annotated in other ways.

The image data may be obtained by one or more of a camera, an inertial measurement unit, a depth sensor, and/or other sensors. In some embodiments, the image data includes data generated by video and/or image acquisition devices, and/or voice recording devices, a user interface, and/or any combination thereof. In some embodiments, the image data is generated via a user interface (e.g., of a user computing platform 104), an environment sensor (e.g., that is part of a user computing platform 104 and/or other computing systems), an external location information database (e.g., included in external resources 124), and/or other sources of information. The image data may be generated responsive to a user request, and/or automatically by the system (e.g., without initiation by a user). In some embodiments, the image data is captured by a mobile computing device (e.g., a user computing platform 104) associated with a user and transmitted to one or more processors 128 (e.g., receiving component 108) with or without user interaction.

In some embodiments, receiving image data comprises receiving sensor data from one or more environment sensors. The one or more environment sensors comprise a global positioning system (GPS) sensor, an accelerometer, a gyroscope, a barometer, a microphone, a depth sensor, and/or other sensors.

The received image data provides a description of a physical scene at the location. The image data may include interior and/or exterior information about the location, and/or other information. Receiving component 108 may be configured such that graphical user interfaces, such as those provided by native applications on mobile devices or browser applications (e.g., by computing platforms 104), may be controlled to enable interactive instructions for the user during an image data (e.g., video) capture process. These graphical user interfaces (controlled by receiving component 108) can also enable a user to provide further text, audio, image, and video data in support of the captured images and videos. Data from additional sensors, including GPS, accelerometers, gyroscopes, barometers, depth sensors, microphones, and/or other sensors, can also be used for capturing properties of the surrounding environment.

By way of a non-limiting example, a user (and/or system 100 without the user) can use cameras, user interfaces, environmental sensors, external information databases, and/or other sources to acquire image data about a location, and its contents and structures. The information collected can subsequently be input to automated processes (e.g., the one or more machine learning models and processor functionality described herein) for anonymization, further identifying objects, surfaces, contents, structures, etc.

One example method of image data capture involves capturing video recordings. These recordings may be processed (e.g., by the one or more electronic models and/or components 108-112) in real time during the capture or captured in advance and processed at some later point in time. During a real time video capture, a graphical user interface (e.g., controlled by receiving component 108 and presented by a computing platform 104 associated with the user) can provide interactive instructions to the user to guide them through the process. The one or more electronic models (e.g., a machine learning model) and/or processing components processing the real time video stream can identify if certain surfaces, contents, or structures require additional captures by the user. When this occurs, the user may be immediately prompted to capture additional images or videos of specific aspects of the physical scene. When a user captures a video in advance, it can subsequently be processed by the same electronic (machine learning) model(s) to obtain an inventory of identified surface, contents, and structures, for the location. Audio and other sensor data may be captured by the user as well, providing more context for the image and video recordings. The same data capture flow may be used when a user captures a collection of still images of the physical scene, including general images of the physical scene as well as close ups of surfaces and/or other items of interest that might be necessary. Additionally, the real time video stream capture format (including the anonymization described herein) may be incorporated as part of a collaborative process with a service provider (e.g., moving services, insurance services, etc.) who can provide interactive guidance to the user through a graphical user interface, for example.

In some embodiments, a graphical user interface for interactively capturing the physical scene at the location through images and video with visual feedback may be provided by receiving component 108 via a user computing platform 104 to a user, for example. The feedback may include, but is not limited to, real-time information about a status of the electronic representation being constructed, natural language instructions to a user, or audio or visual indicators of information being added to the electronic representation. The graphical user interface also enables a user to pause and resume data capture within the location. Accordingly, the electronic representation may be updated upon receiving additional data related to the location.

Anonymizing component 110 is configured to receive image data from an imaging device (e.g., included in computing platform 104); determine that a suspect portion of the image data can or does contain PII; generate anonymized image data by digitally altering the suspect portion of the image data to substantially remove the PII; and modify the image data by replacing the suspect portion of the image data with the anonymized image data. The anonymized image data comprises only the PII and does not include other portions of the image data that do not contain the PII.

As described above, PII comprises information which is related to an identified or identifiable natural person. This may include, for example, an image of a face, an image (e.g., including a reflection) of a person, an image of an animal, a document listing a name, a document listing an address, an identification card, a calendar, a prescription bottle, a title of a book, a document that includes other PII, an image of a landmark, a license plate, and/or images of other things, for example. Substantially removing the PII from the image data comprises applying one or more digital alterations to the image data that reduce or eliminate an ability of a person or computer software to obtain the PII from the anonymized image data.

A suspect portion of the image data that can contain PII comprises types of objects identified in the image data that are known to sometimes include PII, but not always. The types of objects comprise mirrors, picture frames, photographs, television or computer monitors, windows, and/or text containing objects, as several examples. In some embodiments, for example, determining that the suspect portion of the image data does contain PII comprises performing facial recognition on the image data to detect a face. Generating of anonymized image data digitally alters the face. In some embodiments, for example, determining that the suspect portion of the image data does contain PII comprises performing optical character recognition on the image data to detect characters. The generating of anonymized image data digitally alters the characters.

In some embodiments, anonymizing component 110 is configured to identify an object from the image data; determine that the object is a suspect object that can include the PII; and generate the anonymized image data for at least a portion (e.g., a portion that includes an image of a face, a portion that includes text, etc.) of the suspect object. In some embodiments, anonymizing component 110 is configured to identify a plurality of objects from the image data and generate anonymized image data for only the suspect object and not generate anonymized image data for any of the plurality of objects not identified as suspect objects. Generating anonymized image data only for the suspect object comprises anonymizing the PII and potential incidental anonymization of nearby image data including pixels near a boundary of a photo, face, or document; and/or pixels in spaces between and inside text, for example.

In some embodiments, digitally altering the suspect image data is configured to make it impossible for most humans to obtain the PII by visual inspection of images generated from the anonymized image data. In some embodiments, digitally altering the suspect image data is configured to make it impossible, or require a significant increase in processing power and/or time, for a computer to extract usable PII from the anonymized image data. Digitally altering the suspect portion of the image data comprises one or more of gaussian blurring, redacting or removing, or replacement of the suspect image data with a generic image from a library or a generic 3D model (such as a glTF file), and/or other digital alterations. A degree of digitally altering the suspect portion of the image data may vary from a blurring or pixelation to a full redaction or removal of the suspect portion of the image data. In some embodiments, black pixels may be used to show "no data" for an electronic representation, for example, if a user forgets to scan one wall. Anonymizing component 110 is configured to make it clear the data was captured, but is redacted (e.g., by blurring and/or other techniques).

In some embodiments, anonymizing component 110 need not run entirely on a user's device (computing platform 104). For example, it may be computationally infeasible to fit all of the anonymizing component 110 algorithm(s) on the user's device. In some embodiments, if that is not feasible (e.g., too much processing power required), some or all of anonymizing component 110 could also run on (a cloud) server 102, or be split (e.g., face detection on device, item detection in the cloud). Continuing with this example, anonymizing component 110 may be configured to store the suspect portion of the image data in temporary computer memory (e.g., electronic storage 126 in computing platform 104), perform the generation of the anonymized image data from the suspect portion without storing the suspect portion in permanent computer memory; and transfer the anonymized image data to permanent computer memory (e.g., in computing platform 104, a server 102, and/or in other locations). The generating of the anonymized image data may be performed at an imaging device (e.g., which may be included in computing platform 104). Determining that a suspect portion of the image data can or does contain PII may be performed in a first part at the imaging device (e.g., at computing platform 104) and in a second part at a server (e.g., server 102). In this example, the first part may include performing facial recognition (as one possibility) and the second part includes performing object identification (e.g., of tables, chairs, walls, and/or other items that do not include PII).

In some embodiments, the suspect portion of image data is anonymized within a two dimensional (2D) bounding box, a three dimensional (3D) bounding box, a 2D polygon, a 3D polygon, a semantic segmentation, and/or by other methods. For example, the output layer of many common 2D object detection algorithms (e.g., YOLOv5) is a 2D bounding box.

In some embodiments, anonymizing component 110 is configured to receive or generate a series of images (e.g., a series of .jpeg files from a video) and store the series of images in memory. Anonymizing component 110 is configured to detect (e.g., by way of a trained neural network and/or by other methods) objects and/or other components in the images that contain PII, and then blur the portions of those images associated with the PII. The objects may comprise labels (e.g., art, picture, monitor, window, etc.) and/or other information. For example, a video may be processed such that a minimal set of keyframe images are extracted in order to present detections of objects that may include PII by an object detection model (e.g., a machine learning model as described herein) in combination with a detection-based tracker. Video frames are input to the object detection model, and detections are associated with one another by the detection-based tracker in order to identify distinct detections across the video. This temporal association can be used to error correct spurious detections. For example, if a television is correctly detected by the object detector as a television in 10 frames out of 12 but incorrectly detected as a microwave oven in the other two frames, the temporal filtering can correct the mis-detected microwave ovens as televisions. The detections can be used as regions to obfuscate via blurring, and the blurred images may then be re-assembled into a video that has blurred portions where PII used to appear.

In some embodiments, determining that a suspect portion of the image data can or does contain PII comprises performing object detection and mask prediction on the image data using a neural network. As an example, the neural network may be a mask region based convolutional neural network (R-CNN). In some embodiments, Mask R-CNN is used. Mask R-CNN is an example of a neural network that performs two main tasks. First, it detects whether an object of interest (as an example, a person or the face of a person) may be present in an image. This is performed by a region proposal network that attempts to find a relevant part of an image that may include an object of interest. Mask R-CNN also includes a small sub-network configured to classify that relevant part of the image. This way, the presents systems and methods obtain information about image content. If the object of interest is present, a mask is produced which specifies where the object of interest (e.g., the person in this example) is within the image. This means that the Mask R-CNN has successfully detected and classified a region of an image that includes a person (in this example). Another sub-network is configured to output a mask that indicates which pixels within the relevant part of the image belong to the object of interest. Mask R-CNN is useful because it addresses PII detection directly—i.e., for each image in a video, Mask R-CNN can determine whether a person (or other PII) is present in an image, and if so, indicate which pixels should be anonymized (e.g., blurred) to remove the PII.

In some embodiments, generating anonymized image data by digitally altering the suspect portion of the image data to substantially remove the PII, and modifying the image data by replacing the suspect portion of the image data with the anonymized image data comprises extracting binary masks from neural network outputs and saving the binary masks to a video file. A metadata file is saved that stores indices of frames of the image data in which PII was detected. The binary masks are combined with the image data based on the indices. A blur is applied to frames of the image data that contain PII based on the masks.

Predicted masks may be used in two (or more) ways. (1) Predicted masks may be used to blur PII in video frames. In this instance there may be no 3D data-processing, and the system may be configured to apply the blurring procedure as needed through the video. (2) Predicted masks may be used to blur PII in a textured model. Here, 3D information along with a color video plus a mask video is needed. Once an image is selected as a source for a texture, the system is configured to apply the blurring procedure before projection onto a 3D mesh.

In some embodiments, the blurring procedure may include some or all of the following operations, and/or other operations. 1. Dilate an input binary mask by a user-specified dilation amount. 2. Apply a Gaussian blur to the binary mask to obtain feathering around the edges (here the mask is no longer binary—it contains a weights from 0-1). 3. Resize the input image to a mask size (mask size <<image size). 4. Apply a Gaussian blur to the resized image from operation 3. 5. Resize the blurred image from operation 4 back to the original image size (and label this image as B—see the equation below). 6. Resize the mask from operation 2 to image size (and label this image as M). 7. If the original, non-blurred image is labeled as I, then the final image O with PII removed is given as: $O=(1.0-M)*I+M*B$. This blurring procedure is configured to generate a smooth transition between a region of interest and the rest of an image. This leads to much more visually pleasing results while still removing PII, among other advantages.

Generating component 112 is configured to generate, with a trained machine learning model, an electronic representation (e.g., a 2D or 3D model) of the physical scene of the location based on the anonymized image data and/or other information. The electronic representation comprises data items corresponding to objects, surfaces, and/or contents in the physical scene, and/or other information. In some embodiments, the electronic representation comprises a textured or untextured three-dimensional mesh with vertices connected by edges, defining triangular or quadrilateral planar faces. The vertices and the faces each separately comprise position, color, and/or surface normal information. In some embodiments, generating the electronic representation of the physical scene comprises rendering a mesh for manipulation by the user in a browser (running on a user computing platform 104)

Generating component 112 is also configured to extract data items (e.g., objects, surfaces, and/or contents of a physical scene) from the electronic representation with the trained machine learning model, and determine attributes of the data items. The attributes comprise dimensions and/or locations of the surfaces and/or contents of the physical scene. In some embodiments, extracting the data items includes providing the electronic representation as an input to the trained machine learning model to identify the data items. For example, the trained machine learning model may comprise a convolutional neural network (CNN) and may be trained to identify objects and structures in multiple physical scenes as the data items.

One or more machine learning models may work cooperatively to generate electronic representation. For example, in an embodiment, a first machine learning model may be configured to determine that a suspect portion of image data can or does contain PII (and anonymize that image data—as described above related to anonymizing component 110). A second machine learning model may be configured to generate the electronic representation. A third machine learning model may be trained to generate semantic segmentation or instance segmentation information or object detections from a given input image. A fourth machine learning model may be configured to estimate pose information associated with a given input image. A fifth machine learning model may be configured to spatially localize metadata to an input image or an input 3D model (e.g., generated by the second machine learning model). In an embodiment, two or more of the machine learning models may be combined into a single machine learning model by training the single machine learning model accordingly. In the present disclosure, a machine learning model may not be identified by specific reference numbers like "first," "second," "third," and so on, but the purpose of each machine learning model will be clear from the description and the context discussed herein. Accordingly, a person of ordinary skill in the art may modify or combine one or more machine learning models to achieve the effects discussed herein. Also, although some features may be achieved by a machine learning model, alternatively, an empirical model, an optimization routine, a mathematical equation (e.g., geometry-based), etc. may be used.

In an embodiment, a system or a method may be configured to generate an electronic representation of the physical scene at the location with spatially localized information of elements within the location being embedded in the electronic representation. For example, in an embodiment of a trained machine learning model (AI) (e.g., processors 128 shown in FIG. 1 and/or the one or more electronic (machine learning) models described herein), may include natural language processing algorithms, machine learning algorithms, neural networks, regression algorithms, and/or other artificial intelligence algorithms and electronic models. Description data such as video or audio (e.g., provided by a user such as a consumer) may be divided into smaller segments (units) using spatial, and/or temporal constraints as well as other data such as context data. For example, a video may be divided into multiple frames and poor quality images with low lighting and/or high blur may be filtered out. Similarly, an audio input may filter out segments comprising background noise and create units of audio where a speaker (e.g., the consumer) is actively communicating.

A neural network (e.g., convolutional and/or recurrent) may be based on a large collection of neural units (or artificial neurons). The one or more neural networks may loosely mimic the manner in which a biological brain works (e.g., via large clusters of biological neurons connected by axons). Each neural unit of a neural network may be connected with many other neural units of the neural network. Such connections may be enforcing or inhibitory in their effect on the activation state of connected neural units. In an embodiment, each individual neural unit may have a summation function that combines the values of all its inputs together. In an embodiment, each connection (or the neural unit itself) may have a threshold function such that a signal must surpass the threshold before it is allowed to propagate to other neural units. These neural network systems may be self-learning and trained, rather than explicitly programmed, and can perform significantly better in certain areas of problem solving, as compared to traditional computer programs. In an embodiment, the one or more neural networks may include multiple layers (e.g., where a signal path traverses from front layers to back layers). In an embodiment, back propagation techniques may be utilized by the neural networks, where forward stimulation is used to reset weights on the "front" neural units. In an embodiment, stimulation and inhibition for the one or more neural networks may be freer flowing, with connections interacting in a more chaotic and complex fashion. In an embodiment, the intermediate layers of the one or more neural networks include one or more convolutional layers, one or more recurrent layers, and/or other layers.

The one or more neural networks may be trained (i.e., whose parameters are determined) using a set of training data. The training data may include a set of training samples. Each sample may be a pair comprising an input object (typically a vector, which may be called a feature vector) and a desired output value (also called the supervisory signal)—e.g., an input-output pair. As described above, training inputs may be images, annotations, and/or other information, for example. A training algorithm analyzes the training data and adjusts the behavior of the neural network by adjusting the parameters (e.g., weights of one or more layers) of the neural network based on the training data. For example, given a set of N training samples of the form $\{(x_1, y_1), (x_2, y_2), \ldots, (x_N, y_N)\}$ such that $x_i$ is the feature vector of the i-th example and $y_i$ is its supervisory signal, a training algorithm seeks a neural network $g: X \rightarrow Y$, where X is the input space and Y is the output space. A feature vector is an n-dimensional vector of numerical features that represent some object (e.g., an image of a room with objects to be moved as in the example above). The vector space associated with these vectors is often called the feature space. After training, the neural network may be used for making predictions using new samples (e.g., images of different rooms).

In some embodiments, generating component 112 may be configured such that data generated by system 100 can be exported both to external applications for further analysis and work, as well as to a downloadable report for documentation and future use.

Figure 2:
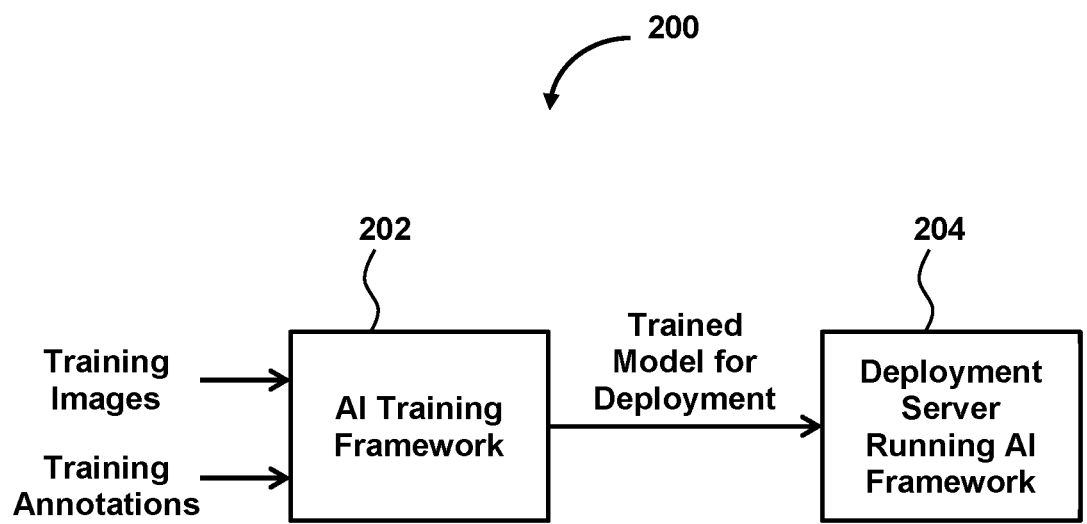
FIG. 2 illustrates an artificial intelligence (AI) (e.g., one or more electronic machine learning models) model that may be trained to determine that a suspect portion of image data can or does contain PII, generate anonymized image data by digitally altering the suspect portion of the image data to substantially remove the PII, modify the image data by replacing the suspect portion of the image data with the anonymized image data, recognize objects, surfaces, and/or contents in a physical scene at a location, and/or generate an electronic representation of the location, in accordance with one or more embodiments.

FIG. 2 illustrates an artificial intelligence (AI) (e.g., one or more electronic machine learning models such as neural networks) model 200 that may be trained to determine that a suspect portion of image data can or does contain PII, generate anonymized image data by digitally altering the suspect portion of the image data to substantially remove the PII, modify the image data by replacing the suspect portion of the image data with the anonymized image data, recognize objects, surfaces, and/or contents in a physical scene at a location, generate an electronic representation, and/or perform other operations in accordance with one or more embodiments. Model 200 may form some or all of anonymizing component 110 (FIG. 1) and/or generating component 112 (FIG. 1), for example. Model 200 may be trained with training data. The training data may comprise input output training pairs associated with each potential data item (e.g., portions of image data that include PII). Model 200 (e.g., a machine learning model) may be trained by obtaining physical scene data associated with a specified physical scene at the location (where the physical scene data includes image data comprising an image, a video or a three dimensional digital model associated with the specified physical scene); and training model 200 with the physical scene data to predict a specified set of objects, surfaces, and/or contents in the specified physical scene (e.g., those that might include PII) such that a cost function that is indicative of a difference between a reference set of objects, surfaces, and/or contents and the specified set of contents is minimized. Trained model 200 is configured to predict which objects, surfaces, and/or contents include PII, spatial localization data of the data items, and/or other information. The spatial localization data corresponds to location information of the surfaces and/or contents in the physical scene.

For example, multiple training images with objects, surfaces, contents, etc. that need to be detected because they include PII may be presented to an artificial intelligence (AI) framework 202 for training. Training images may contain objects, surfaces such as walls, ceilings, floors, and or other contents that include PII. Each of the training images may have annotations (e.g., location of objects or surfaces in the image, coordinates, and/or other annotations) and/or pixel wise classification for contents, walls, floors, ceilings, and/or other surfaces, and/or other training images. Responsive to training being complete, the trained model (and/or one or more trained models) may be sent to a deployment server 204 (e.g., server 102 shown in FIG. 1) running a machine learning (e.g., AI) framework. It should be noted that training data is not limited to images and may include different types of input such as audio input (e.g., voice, sounds, etc.), user entries and/or selections made via a user interface, scans and/or other input of textual information, and/or other training data. The models, based on such training, be configured to recognize voice commands and/or input, textual input, etc.

Deployment server 204 may be a standalone server and/or a module that may be deployed as part of an app in a user's smartphone, tablet, and/or other personal computing device, in accordance with one or more embodiments.

The following descriptions of the various figures provide several non-limiting examples of the functionality of anonymizing component 110 and/or additional aspects of one or more other components of system 100 shown in FIG. 1, and/or the operations performed by these components.

Figure 3:
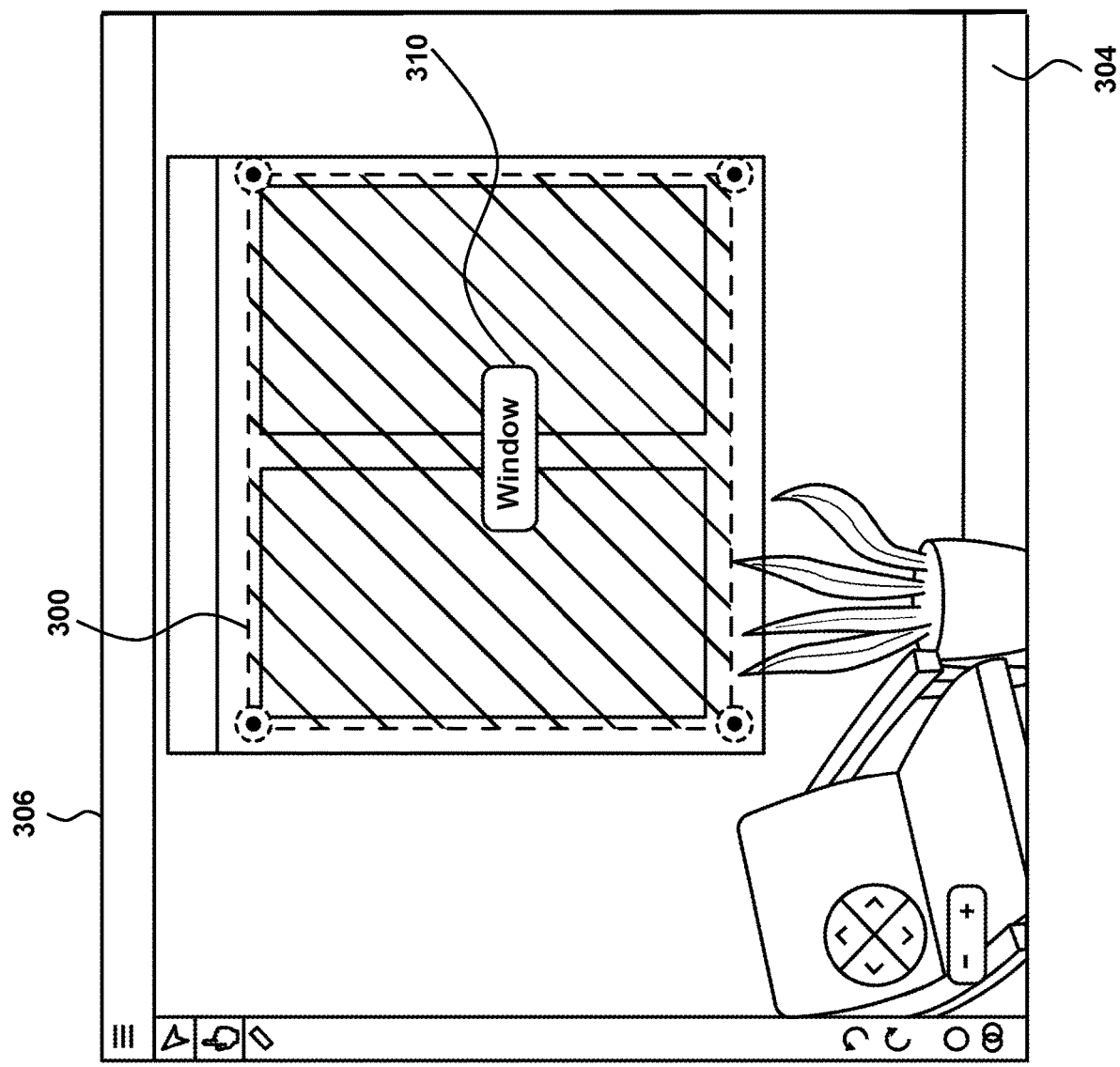
FIG. 3 illustrates an area of window in an image or video that is part of image data obtained by an imaging device determined to be a suspect portion of the image data that can or does contain PII, in accordance with one or more embodiments.

FIG. 3 illustrates an area 300 of window 310 in an image or video 304 that is part of image data obtained by an imaging device (e.g. a camera, a depth sensor, etc.) of a user device (e.g., computing platform 104 shown in FIG. 1). In this example, area 300 of window 310 has been determined (e.g., by anonymizing component 110 shown in FIG. 1) to be a suspect portion of the image data that can or does contain PII. This may be because there was a reflection of a face in the window, a face of a person outside was visible through the window, and/or for other reasons, for example. Anonymizing component 110 is configured to generate anonymized image data for area 300 of window 310 by digitally altering area 300 to substantially remove the PII; and modifying the image data by replacing area 300 with the anonymized image data. As described above, in some embodiments, the suspect portion of image data (area 300 in this example) is anonymized within a two dimensional (2D) bounding box as shown in FIG. 3. However, the suspect portion of image data (area 300 in this example) may be anonymized within a three dimensional (3D) bounding box, a 2D polygon, a 3D polygon, a semantic segmentation, and/or by other methods. In this example, anonymizing could take many forms. Anonymizing component 110 (FIG. 1) could be configured to generate a Gaussian blur inside area 300, black out area 300, replace area 300 with a generic image from a library or a generic 3D model, and/or perform other anonymization. Note that the image or video 304 is displayed in a browser 306 in FIG. 3 for illustration purposes, but need not be displayed this way to allow system 100 (FIG. 1) to function as described herein.

Figure 4:
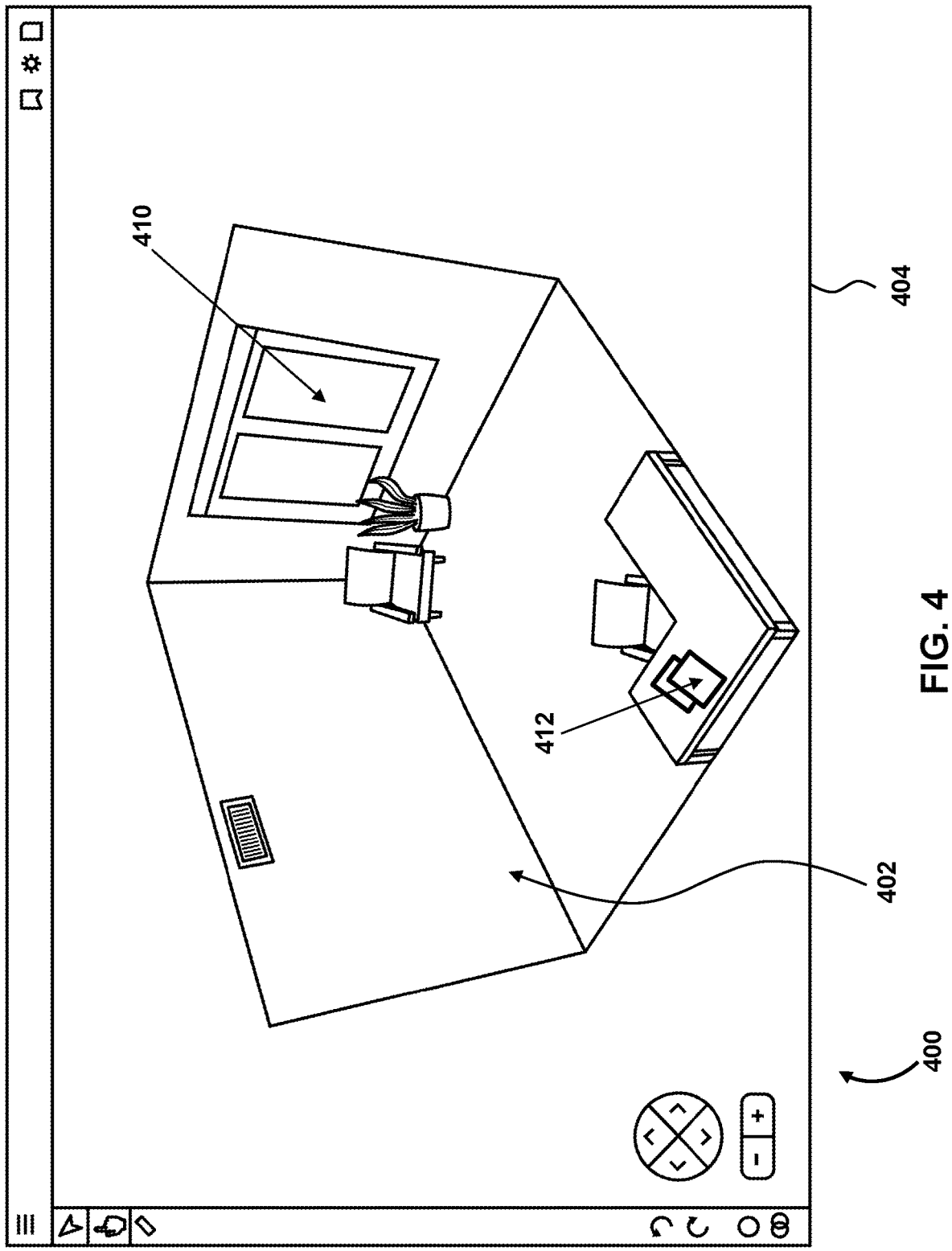
FIG. 4 illustrates an example of a view of an electronic representation of a physical scene (e.g. a room) at a location (e.g., a house) in a browser with portions of the electronic representation being anonymized, in accordance with one or more embodiments.

FIG. 4 illustrates an example of a view 400 of an electronic representation 402 of a physical scene (e.g. a room) at a location (e.g., a house) in a browser 404. Electronic representation 402 may include objects, such as a window 410 (which may model window 310 shown in FIG. 3) and papers 412 in this example, where PII has been anonymized (e.g., blurred). Original image data associated with window 310 (FIG. 3) may have included a reflection of a face, for example, as described above. Original image data associated with papers 412 may have included text that contained PII. Electronic representation 402 may be output by generating component 112 shown in FIG. 1, for example, based on anonymized image data generated by anonymizing component 110 (FIG. 1). Electronic representation 402 may comprise a representation of detected objects, surfaces, etc. (e.g., the mesh described above) in a desktop or mobile browser 404.

Figure 5:
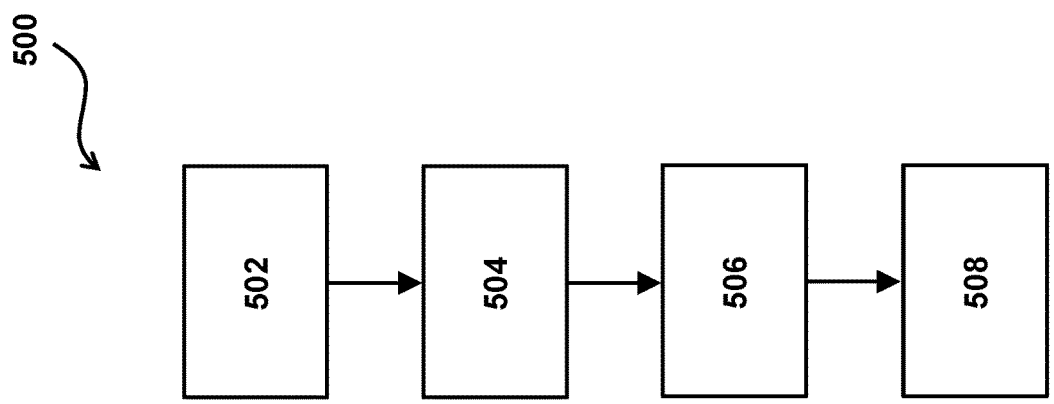
FIG. 5 illustrates a method for anonymizing PII, in accordance with one or more embodiments.

FIG. 5 illustrates a method 500 for anonymizing PII. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting. In some embodiments, some or all of method 500 may be implemented in one or more processing devices (e.g., a digital processor, an analog processor, a digital circuit designed to process information, an analog circuit designed to process information, a state machine, and/or other mechanisms for electronically processing information). The one or more processing devices (e.g., processor(s) 128, computing platform 104, server 102, etc., described herein) may include one or more devices executing some or all of the operations of method 500 in response to instructions (e.g., instructions 106) stored electronically on an electronic storage medium (e.g., electronic storage 126, etc.). The one or more processing devices may include one or more devices configured through hardware, firmware, and/or software to be specifically designed for execution of one or more of the operations of method 500.

At an operation 502, image data may be received from an imaging device. At an operation 504, it may be determined that a suspect portion of the image data can or does contain PII. At an operation 506, anonymized image data may be generated by digitally altering the suspect portion of the image data to substantially remove the PII. At an operation 508, the image data may be modified by replacing the suspect portion of the image data with the anonymized image data. Details of each of these operations are described herein.

Several terms used in the present disclosure are discussed below to improve the understanding of concepts of the present disclosure. "Extrinsics" or "extrinsics matrix" refers to a matrix representation of the rigid-body transformation between a fixed 3-dimensional Cartesian coordinate system defining the space of a virtual world and a 3-dimensional Cartesian coordinate system defining that world from the viewpoint of a specific camera. "Inertial measurement unit" (IMU) refers to a hardware unit comprising accelerometers, gyroscopes, and magnetometers that can be used to measure the motion of a device in physically-meaningful units. "Intrinsics" or "Intrinsics matrix" refers to a matrix representation of physical attributes of a real camera comprising focal length, principal point, and skew. "Point cloud" refers to a collection of 3-dimensional points, wherein each point "Mesh" refers to an explicit representation of a 3D surface consisting of vertices connected by edges. The vertices comprise information including 3D position, color information, and surface normal information, among other pertinent data, with the possible addition of texture coordinates, while the edges define planar surfaces called faces, typically triangular or quadrilateral, which themselves may comprise color information, surface normals, among other pertinent data. "Convolutional neural network" (CNN) refers to a particular neural network having an input layer, hidden layers, and an output layer and configured to perform a convolution operation. The hidden layers (also referred as convolutional layers) convolve the input and pass its result to the next layer. "Simultaneous localization and mapping" (SLAM) refers to a class of algorithms that estimate both camera pose and scene structure in the form of point cloud. SLAM is applicable to ordered data, for example, a video stream. SLAM algorithms may operate at interactive rates, and can be used in online settings. The term "metadata" refers to a set of data that describes and gives information about other data. The term "electronic representation" refers to a geometric model of a physical scene at a location in a digital form and may include texture or color information. The electronic representation may be represented in the form of a 3D mesh, a 3D solid, a 3D boundary, a 3D point cloud, or other digital formats. The electronic representation comprises an information-rich data representation of a location that takes the form of a 3D model, textured or otherwise, along with semantically labeled elements, spatially localized metadata, and/or application-specific data. In some embodiments, the electronic representation may comprise a building information model representation of a location to facilitate design, construction, insurance, and operation processes to form a reliable basis for decisions related to services and/or tasks to be performed at the location.

In the following, further features, characteristics, and exemplary technical solutions of the present disclosure will be described in terms of items that may be optionally claimed in any combination:

1. A non-transitory, machine readable medium storing instructions which, when executed by at least one programmable processor, cause the at least one programmable processor to perform operations comprising: receiving image data from an imaging device; determining that a suspect portion of the image data can or does contain personally identifying information (PII); generating anonymized image data by digitally altering the suspect portion of the image data to substantially remove the PII; and modifying the image data by replacing the suspect portion of the image data with the anonymized image data.

2. The medium of any previous item, wherein PII comprises information which is related to an identified or identifiable natural person.

3. The medium of any previous item, wherein a suspect portion of the image data that can contain PII comprises types of objects identified in the image data that are known to sometimes include PII, but not always.

4. The medium of any previous item, wherein the types of objects comprise mirrors, picture frames, photographs, television or computer monitors, windows, and/or text containing objects.

5. The medium of any previous item, wherein the PII comprises one or more of an image of a face, a person, an animal, a document listing a name, a document listing an address, an identification card, a calendar, a prescription bottle, a title of a book, a document that includes PII, an image of a landmark, or a license plate.

6. The medium of any previous item, wherein the imaging device comprises a depth sensor and/or a camera, and the image data comprises depth information from the depth sensor and/or pictures or video from the camera.

7. The medium of any previous item, wherein digitally altering the suspect portion of the image data comprises one or more of gaussian blurring, redacting or removing, or replacement of the suspect image data with a generic image from a library or a generic 3D model.

8. The medium of any previous item, wherein digitally altering the suspect portion of the image data comprises blurring the suspect image data.

9. The medium of any previous item, wherein a degree of digitally altering the suspect portion of the image data varies from a blurring or pixelation to a full redaction or removal of the suspect portion of the image data.

10. The medium of any previous item, wherein substantially removing the PII comprises applying one or more digital alterations to the image data that reduce or eliminate an ability of a person or computer software to obtain the PII from the anonymized image data.

11. The medium of any previous item, wherein digitally altering the suspect image data is configured to make it impossible for most humans to obtain the PII by visual inspection of images generated from the anonymized image data.

12. The medium of any previous item, wherein digitally altering the suspect image data is configured to make it impossible, or require a significant increase in processing power and/or time, for a computer to extract usable PII from the anonymized image data.

13. The medium of any previous item, the operations further comprising determining that the suspect portion of the image data does contain PII.

14. The medium of any previous item, the determining comprising performing facial recognition on the image data to detect a face, wherein the generating of anonymized image data digitally alters the face.

15. The medium of any previous item, the determining comprising performing optical character recognition on the image data to detect characters, wherein the generating of anonymized image data digitally alters the characters.

16. The medium of any previous item, the operations further comprising: identifying an object from the image data; determining that the object is a suspect object that can include the PII; and generating the anonymized image data for at least a portion of the suspect object.

17. The medium of any previous item, the operations further comprising: identifying a plurality of objects from the image data; and generating anonymized image data for only the suspect object and not generating anonymized image data for any of the plurality of objects not identified as suspect objects.

18. The medium of any previous item, wherein generating anonymized image data only for the suspect object comprises anonymizing the PII and potential incidental anonymization of nearby image data including pixels near a boundary of a photo, face, or document; and/or pixels in spaces between and inside text.

19. The medium of any previous item, wherein the anonymized image data comprises only the PII and does not include other portions of the image data that do not contain the PII.

20. The medium of any previous item, the operations further comprising: storing the suspect portion of the image data in temporary computer memory; performing the generation of the anonymized image data from the suspect portion without storing the suspect portion in permanent computer memory; and transferring the anonymized image data to permanent computer memory.

21. The medium of any previous item, wherein the generating of the anonymized image data is performed at the imaging device.

22. The medium of any previous item, wherein the determining is performed in a first part at the imaging device and in a second part at a server.

23. The medium of any previous item, wherein the first part includes performing facial recognition and the second part includes performing object identification.

24. The medium of any previous item, wherein the suspect portion is anonymized within a two dimensional (2D) bounding box, a three dimensional (3D) bounding box, a 2D polygon, a 3D polygon, or a semantic segmentation.

25. The medium of any previous item, wherein the image data is 3D.

26. The medium of any previous item, wherein determining that a suspect portion of the image data can or does contain personally identifying information (PII) comprises performing object detection and mask prediction on the image data using a neural network.

27. The medium of any previous item, wherein the neural network is a mask region based convolutional neural network (R-CNN).

28. The medium of any previous item, wherein generating anonymized image data by digitally altering the suspect portion of the image data to substantially remove the PII, and modifying the image data by replacing the suspect portion of the image data with the anonymized image data comprises: extracting binary masks from neural network outputs and saving the binary masks to a video file; saving a metadata file that stores indices of frames of the image data in which PII was detected; combining the binary masks with the image data based on the indices; and applying a blur to frames of the image data that contain PII based on the masks.

29. The medium of any previous item, the operations further comprising generating a 2D image or 3D model based at least on the anonymized image data.

30. The medium of any previous item, the operations further comprising generating, with a machine learning model, an inventory list based at least on the anonymized image data.

31. A method for anonymizing personally identifying information (PII), the method comprising: receiving image data from an imaging device; determining that a suspect portion of the image data can or does contain PII; generating anonymized image data by digitally altering the suspect portion of the image data to substantially remove the PII; and modifying the image data by replacing the suspect portion of the image data with the anonymized image data.

32. The method of any previous item, wherein PII comprises information which is related to an identified or identifiable natural person.

33. The method of any previous item, wherein a suspect portion of the image data that can contain PII comprises types of objects identified in the image data that are known to sometimes include PII, but not always.

34. The medium of any previous item, wherein the types of objects comprise mirrors, picture frames, photographs, television or computer monitors, windows, and/or text containing objects.

35. The method of any previous item, wherein the PII comprises one or more of an image of a face, a person, an animal, a document listing a name, a document listing an address, an identification card, a calendar, a prescription bottle, a title of a book, a document that includes PII, an image of a landmark, or a license plate.

36. The method of any previous item, wherein the imaging device comprises a depth sensor and/or a camera, and the image data comprises depth information from the depth sensor and/or pictures or video from the camera.

37. The method of any previous item, wherein digitally altering the suspect portion of the image data comprises one or more of gaussian blurring, redacting or removing, or replacement of the suspect image data with a generic image from a library or a generic 3D model.

38. The method of any previous item, wherein digitally altering the suspect portion of the image data comprises blurring the suspect image data.

39. The method of any previous item, wherein a degree of digitally altering the suspect portion of the image data varies from a blurring or pixelation to a full redaction or removal of the suspect portion of the image data.

40. The method of any previous item, wherein substantially removing the PII comprises applying one or more digital alterations to the image data that reduce or eliminate an ability of a person or computer software to obtain the PII from the anonymized image data.

41. The method of any previous item, wherein digitally altering the suspect image data is configured to make it impossible for most humans to obtain the PII by visual inspection of images generated from the anonymized image data.

42. The method of any previous item, wherein digitally altering the suspect image data is configured to make it impossible, or require a significant increase in processing power and/or time, for a computer to extract usable PII from the anonymized image data.

43. The method of any previous item, further comprising determining that the suspect portion of the image data does contain PII.

44. The method of any previous item, the determining comprising performing facial recognition on the image data to detect a face, wherein the generating of anonymized image data digitally alters the face.
45. The method of any previous item, the determining comprising performing optical character recognition on the image data to detect characters, wherein the generating of anonymized image data digitally alters the characters.
46. The method of any previous item, further comprising: identifying an object from the image data; determining that the object is a suspect object that can include the PII; and generating the anonymized image data for at least a portion of the suspect object.
47. The method of any previous item, further comprising: identifying a plurality of objects from the image data; and generating anonymized image data for only the suspect object and not generating anonymized image data for any of the plurality of objects not identified as suspect objects.
48. The method of any previous item, wherein generating anonymized image data only for the suspect object comprises anonymizing the PII and potential incidental anonymization of nearby image data including pixels near a boundary of a photo, face, or document; and/or pixels in spaces between and inside text.
49. The method of any previous item, wherein the anonymized image data comprises only the PII and does not include other portions of the image data that do not contain the PII.
50. The method of any previous item, further comprising: storing the suspect portion of the image data in temporary computer memory; performing the generation of the anonymized image data from the suspect portion without storing the suspect portion in permanent computer memory; and transferring the anonymized image data to permanent computer memory.
51. The method of any previous item, wherein the generating of the anonymized image data is performed at the imaging device.
52. The method of any previous item, wherein the determining is performed in a first part at the imaging device and in a second part at a server.
53. The method of any previous item, wherein the first part includes performing facial recognition and the second part includes performing object identification.
54. The method of any previous item, wherein the suspect portion is anonymized within a two dimensional (2D) bounding box, a three dimensional (3D) bounding box, a 2D polygon, a 3D polygon, or a semantic segmentation.
55. The method of any previous item, wherein the image data is 3D.
56. The method of any previous item, wherein determining that a suspect portion of the image data can or does contain personally identifying information (PII) comprises performing object detection and mask prediction on the image data using a neural network.
57. The method of any previous item, wherein the neural network is a mask region based convolutional neural network (R-CNN).
58. The method of any previous item, wherein generating anonymized image data by digitally altering the suspect portion of the image data to substantially remove the PII, and modifying the image data by replacing the suspect portion of the image data with the anonymized image data comprises: extracting binary masks from neural network outputs and saving the binary masks to a video file; saving a metadata file that stores indices of frames of the image data in which PII was detected; combining the binary masks with the image data based on the indices; and applying a blur to frames of the image data that contain PII based on the masks.
59. The method of any previous item, further comprising generating a 2D image or 3D model based at least on the anonymized image data.
60. The method of any previous item, further comprising generating, with a machine learning model, an inventory list based at least on the anonymized image data.
61. A system comprising one or more processors and machine readable instructions stored on a computer readable medium, the system configured for performing method steps and/or operations comprising those of any previous item.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and sub combinations of the disclosed features and/or combinations and sub combinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention (s), and their equivalents, that are protected thereby.

What is claimed is:

1. A non-transitory, machine readable medium storing instructions which, when executed by at least one programmable processor, cause the at least one programmable processor to perform operations comprising:
    receiving image data from an imaging device, wherein the image data is 3D;
    determining that a suspect portion of the image data contains personally identifying information (PII), wherein the determining comprises performing object detection and mask prediction on the image data using a neural network;
    generating anonymized image data by digitally altering the suspect portion of the image data to substantially remove the PII; and
    modifying the image data by replacing the suspect portion of the image data with the anonymized image data, and wherein the generating anonymized image data and modifying the image data comprises:
        extracting binary masks from neural network outputs and saving the binary masks to a video file;
        saving a metadata file that stores indices of frames of the image data in which PII was detected;
        combining the binary masks with the image data based on the indices; and
        applying a blur to frames of the image data that contain PII based on the masks.

2. The medium of claim 1, wherein PII comprises information which is related to an identified or identifiable natural person.

3. The medium of claim 1, wherein a suspect portion of the image data that contains PII comprises types of objects identified in the image data that are known to sometimes include PII, but not always.

4. The medium of claim 3, wherein the types of objects comprise mirrors, picture frames, photographs, television or computer monitors, windows, and/or text containing objects.

5. The medium of claim 1, wherein the PII comprises one or more of an image of a face, a person, an animal, a document listing a name, a document listing an address, an identification card, a calendar, a prescription bottle, a title of a book, a document that includes PII, an image of a landmark, or a license plate.

6. The medium of claim 1, wherein the imaging device comprises a depth sensor and/or a camera, and the image data comprises depth information from the depth sensor and/or pictures or video from the camera.

7. The medium of claim 1, wherein digitally altering the suspect portion of the image data comprises one or more of gaussian blurring, redacting or removing, or replacement of the suspect image data with a generic image from a library or a generic 3D model.

8. The medium of claim 1, wherein digitally altering the suspect portion of the image data comprises blurring the suspect image data.

9. The medium of claim 1, wherein a degree of digitally altering the suspect portion of the image data varies from a blurring or pixelation to a full redaction or removal of the suspect portion of the image data.

10. The medium of claim 1, wherein substantially removing the PII comprises applying one or more digital alterations to the image data that reduce or eliminate an ability of a person or computer software to obtain the PII from the anonymized image data.

11. The medium of claim 1, wherein digitally altering the suspect image data is configured to make it impossible for most humans to obtain the PII by visual inspection of images generated from the anonymized image data.

12. The medium of claim 1, wherein digitally altering the suspect image data is configured to make it impossible, or require a significant increase in processing power and/or time, for a computer to extract usable PII from the anonymized image data.

13. The medium of claim 1, the operations further comprising determining that the suspect portion of the image data does contain PII.

14. The medium of claim 13, the determining comprising performing facial recognition on the image data to detect a face, wherein the generating of anonymized image data digitally alters the face.

15. The medium of claim 13, the determining comprising performing optical character recognition on the image data to detect characters, wherein the generating of anonymized image data digitally alters the characters.

16. The medium of claim 1, the operations further comprising: identifying an object from the image data;
   determining that the object is a suspect object that includes the PII; and generating the anonymized image data for at least a portion of the suspect object.

17. The medium of claim 16, the operations further comprising: identifying a plurality of objects from the image data; and
   generating anonymized image data for only the suspect object and not generating anonymized image data for any of the plurality of objects not identified as suspect objects.

18. The medium of claim 17, wherein generating anonymized image data only for the suspect object comprises anonymizing the PII and incidental anonymization of nearby image data including pixels near a boundary of a photo, face, or document; and/or pixels in spaces between and inside text.

19. The medium of claim 1, wherein the anonymized image data comprises only the PII and does not include other portions of the image data that do not contain the PII.

20. The medium of claim 1, the operations further comprising:
   storing the suspect portion of the image data in temporary computer memory;
   performing the generation of the anonymized image data from the suspect portion without storing the suspect portion in permanent computer memory; and transferring the anonymized image data to permanent computer memory.

21. The medium of claim 1, wherein the generating of the anonymized image data is performed at the imaging device.

22. The medium of claim 1, wherein the determining is performed in a first part at the imaging device and in a second part at a server.

23. The medium of claim 22, wherein the first part includes performing facial recognition and the second part includes performing object identification.

24. The medium of claim 1, wherein the suspect portion is anonymized within a two dimensional (2D) bounding box, a three dimensional (3D) bounding box, a 2D polygon, a 3D polygon, or a semantic segmentation.

25. The medium of claim 1, wherein the neural network is a mask region based convolutional neural network (R-CNN).

26. The medium of claim 1, the operations further comprising generating a 2D image or 3D model based at least on the anonymized image data.

27. The medium of claim 1, the operations further comprising generating, with a machine learning model, an inventory list based at least on the anonymized image data.

* * * * *